April 24, 1928.
T. F. GITHENS
1,667,417
TOOL AND PROCESS OF MAKING SAME
Filed Nov. 17, 1925
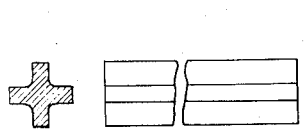
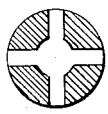
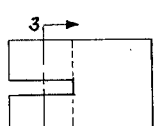
FIG.1   FIG.2.   FIG.3   FIG.4.
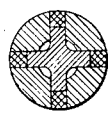
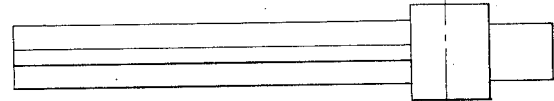
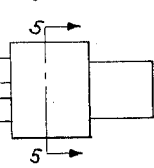
FIG.5.   FIG.6.   FIG.7.
INVENTOR,
Thomas F. Githens.
BY
ATTORNEY.

Patented Apr. 24, 1928.

1,667,417

UNITED STATES PATENT OFFICE.

THOMAS F. GITHENS, OF CLEVELAND HEIGHTS, OHIO, ASSIGNOR TO THE CLEVELAND TWIST DRILL COMPANY, OF CLEVELAND, OHIO, A CORPORATION OF OHIO.

TOOL AND PROCESS OF MAKING SAME.

Application filed November 17, 1925. Serial No. 69,602.

This invention relates to small tools such as drills, reamers and taps, and has reference especially to those formed by joining together two pieces of metal.

An ordinary reamer, for instance, comprises ordinarily two parts, a cylindrical portion which is spirally fluted and a tapered shank portion whereby power may be applied to the drill by its driving chuck. Ordinarily these portions of the tool are integral, the flutes and shanks being machined from proper lengths of solid round bar stock, and the fluted portion subsequently twisted as desired.

Obviously the highest quality of tool steel is required in the cutting or fluted portion, commonly referred to as the "flute" of the tool, but it is equally obvious that for the shank portion, commonly referred to as the "shank" of the tool, metal of only sufficient strength to transmit the necessary power is required. Moreover milling the flutes from the solid bar, removing as it does a very large portion of the original bar of highest quality steel, is an enormously expensive and wasteful operation, and especially so in the larger sizes.

Consequently it is old in the art to utilize for the cutting portion or "flute" of such tools, bar stock rolled to a form in section similar to that of the fluted portion otherwise remaining after milling out the flutes, proper lengths of which are cut, secured to shanks cut from rods of inexpensive but suitable steel, and each fluted portion then twisted to form the "flute" of its tool.

Many attempts have been made to provide suitable means for joining the flute and shank portions, but with indifferent success.

Brazing is obviously of insufficient strength.

Butt welding has been tried but since this requires equal sectional areas at the weld, it necessitates either milling the inner end of the shank to correspond with the section of the flute portion, resulting in a weak joint; employing for the flute portion solid round stock and milling out the flutes after welding, at considerable expense; or upsetting the inner end of the flute portion to form a larger section at the weld; none of which methods are satisfactory.

Another method attempted, known to the trade as "inserting", is to form a cavity at the inner end of the shank corresponding approximately with the maximum diameter of the fluted portion, heating the shank, inserting the inner end of the flute portion therein, and hammering or squeezing the shank about the flute portion to form a mechanical joint therebetween. This method requires a large maximum dimension of shank, with consequent loss in cutting the taper, and results in an unsightly appearance and often in looseness developed after use.

It is the object of my invention to provide a means of joining the shanks and "flutes" of small tools such as hereinbefore referred to, which shall be neat in appearance, of strength at the section of joinder at least equal to that along the "flute," and yet at a minimum cost.

The invention will be readily understood from the following description taken in connection with the accompanying drawings which illustrate various parts and steps in the production of a reamer according to my invention, in which figures in detail:

Figs. 1 and 2 represent a typical section and side view respectively of a length of rolled bar having four radially and longitudinally extending members forming therebetween an equal number of flutes, Fig. 3 is a section along the line 3—3 of Fig. 4, which shows a piece of round bar of dimensions from which a shank may be formed, and suitably finished at its end to receive an end of the bar of Figs. 1 and 2, Fig. 5 is a section along the line 5—5 of Fig. 6 which shows the flute and shank portions welded together to form a reamer, a finishing cut having been taken along the tool, but before the flute portion thereof has been twisted, Fig. 7 is an end view of the tool shown in Fig. 6.

In making the reamer chosen for illustration of my invention, a bar of high grade tool steel is provided, pre-rolled to the cruciform section shown in Fig. 1 which is such that after proper twisting it will form approximately the desired shape, requiring a minimum amount of finishing, for the "flute" of a reamer. A sufficient length, indicated in Fig. 2, for the "flute" of the reamer is cut from this bar.

A bar of round stock, which may be of very ordinary steel is also provided, of somewhat greater outside diameter than that of the fluted bar, and from this is cut a length sufficient for the reamer shank. The end of this piece is then finished to the form shown in Figs. 3 and 4 leaving four longitudinal projections adapted to interlock with and radially overlie the members of the piece of fluted stock when it is placed in abutting relation with the solid portion of shank stock.

The pieces may then be heated if desired and placed with respect to each other as described, leaving a longitudinally extending groove between each pair of projections the sides of each groove being formed from the shank piece, and the bottom of each groove by a member of the flute piece—in other words the parts are placed in alignment, abutting each other, and with the members of their adjacent portions in interlocking relation. This leaves four evenly spaced rectangular grooves longitudinally coextensive with the overlap of the parts.

Maintaining the parts in this position, they are next welded together, beginning along the bottom of each groove, and working outwards, filling up each groove in succession. For this purpose I have successfully employed both gas welding and electric welding, but thermit could be used as well. In any event I have found it most convenient to place the assembled parts extending horizontally, and to first weld in the upper groove, it being the most easily accessible, most visible, and the one wherein the bond between the original and welding metals will be most thorough throughout the groove surfaces.

After each groove has been filled and built up with metal flush with the adjacent portions of the original shank piece, it will be obvious that the result will be a single piece of steel in fact and or ample strength in the section of the formerly overlapping parts, as shown in Fig. 5, the double cross hatching indicating that portion of the section built up by the welding process and corresponding with the grooves referred to. That portion of the tool at the overlap will in fact have become a continuous metal cylinder of substantial thickness and in integral relation with each of the original pieces, the planes of joinder being with reference to the shank member generally radial, (the former grooved sides) and with reference to the flute member, being generally circumferential (the former grooved bottoms).

The next step, after the piece has cooled sufficiently, is to place it in a lathe and take a fine finishing cut along the cylindrical section, only sufficient to correct any misalignment. The shank may then be finished by machining, to the form desired, for example, the form shown in Figs. 6 and 7.

The remainder of the process is similar to that already employed in the art: the flute is twisted, the tool pointed, hardened and ground.

It is to be noted also that I may conveniently highly pre-heat the parts, to further the welding process, and subsequently utilize this heat in the proper treatment of the tool, such as annealing, without appreciable thermal loss.

It is obvious that variations in the exact conformation of the joint will follow from variations in the nature of the tool to which the invention is applied, and consequently I do not limit myself to merely the forms illustrated and described herein. For instance, according to my invention any shank such as square, round or tapered may be applied to any cutting tool such as drill, reamer or tap, regardless of the exact shape or number of flutes required upon the cutting portion of the tool, the only requirement being that when the parts are in assembly for welding, longitudinally extending grooves of sufficient sectional dimension for accessibility, are presented. Obviously also the exact proportions and dimensions to be employed may vary considerably from those illustrated but remain within the scope of my invention, depending upon the tool to which my invention is applied and the service required of it.

What I claim therefore, is:

1. A tool making process comprising forming an end of a metal shank piece to receive an end of a flute piece in interlocking relation, and in said relation to form with said flute piece end longitudinally extending grooves spaced about the periphery of said end portions, assembling said pieces in said relation, and uniting said pieces by welding along said grooves.

2. A tool making process comprising forming an end of a metal shank piece to receive an end of a flute piece in interlocking relation and in said relation to form with said flute piece end longitudinally extending grooves spaced about the periphery of said end portions, assembling said pieces in said relation, and filling said grooves as by welding whereby said periphery comprises a continuous cylinder of metal in integral relation with each of said pieces.

3. A tool making process comprising forming an end of a metal shank piece to receive an end of a flute piece of lesser transverse dimension in interlocking relation and in said relation to extend transversely beyond said flute piece end to form the sides of longitudinally extending grooves spaced about the periphery of said end portions, the bottoms of said grooves being formed by members of said flute piece end, assembling said pieces in said relation, and filling said grooves as by welding whereby said periphery comprises a continuous cylinder of metal in integral relation with each of said pieces.

4. A tool making process comprising forming an end of a metal shank piece to receive an end of a flute piece of lesser transverse dimension in interlocking relation, and in said relation to extend transversely beyond said flute piece end to form the sides of longitudinally extending grooves spaced about the periphery of said end portions, the bottoms of said grooves being formed by members of said flute piece end, and being of dimensions substantially equal to the sides thereof, assembling said pieces in said relation, and filling said grooves as by welding whereby said periphery comprises a continuous cylinder of metal of substantial thickness and in integral relation with each of said pieces.

Signed by me, this 13th day of November, 1925.

THOMAS F. GITHENS.